United States Patent
Holtan et al.

(10) Patent No.: US 11,820,920 B2
(45) Date of Patent: *Nov. 21, 2023

(54) MICROFIBRILLATED CELLULOSE AS A CROSSLINKING AGENT

(71) Applicant: Borregaard AS, Sarpsborg (NO)

(72) Inventors: Synnøve Holtan, Sarpsborg (NO); Katérina Liapis, Sarpsborg (NO); Tom Stylo, Sarpsborg (NO); Jan Berg, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 663 days.

This patent is subject to a terminal disclaimer.

(21) Appl. No.: 16/637,205

(22) PCT Filed: Aug. 14, 2018

(86) PCT No.: PCT/EP2018/072017
§ 371 (c)(1),
(2) Date: Feb. 6, 2020

(87) PCT Pub. No.: WO2019/034649
PCT Pub. Date: Feb. 21, 2019

(65) Prior Publication Data
US 2020/0270428 A1    Aug. 27, 2020

(30) Foreign Application Priority Data

Aug. 14, 2017 (EP) .................................. 17186166
Aug. 14, 2017 (EP) .................................. 17186201
Jul. 6, 2018 (EP) .................................. 18182239

(51) Int. Cl.
*C09J 11/00* (2006.01)
*C09J 11/08* (2006.01)
(Continued)

(52) U.S. Cl.
CPC ............... *C09J 11/08* (2013.01); *B32B 29/08* (2013.01); *C08J 3/005* (2013.01); *C08L 1/02* (2013.01);
(Continued)

(58) Field of Classification Search
None
See application file for complete search history.

(56) References Cited

U.S. PATENT DOCUMENTS 2,884,389 A   4/1959  Corwin et al.
2,886,541 A   5/1959  Langlois et al.
(Continued)

FOREIGN PATENT DOCUMENTS

CN   103590281 A  *  2/2014
CN   104558996 A  *  4/2015
(Continued)

OTHER PUBLICATIONS

CN-103590281-A—English translation (Year: 2014).*
(Continued)

*Primary Examiner* — Stefanie J Cohen
(74) *Attorney, Agent, or Firm* — Choate, Hall & Stewart LLP; Michael D. Schmitt

(57) ABSTRACT

The present invention relates to a composition for use as an adhesive, paint, coating, resin, (surface) size, composite, gel or hydrogel, said composition comprising microfibrillated cellulose ("MFC"). In addition to microfibrillated cellulose, these compositions comprise at least one solvent, said solvent preferably comprising or consisting of water, and at least one compound that is (a) capable of polymerizing, or has already partly or fully, polymerized, and that (b) has at least two groups available for hydrogen bonding, preferably OH groups, that are capable of crosslinking with at least one functional group of the microfibrillated cellulose. In these (Continued)

Figure 1:
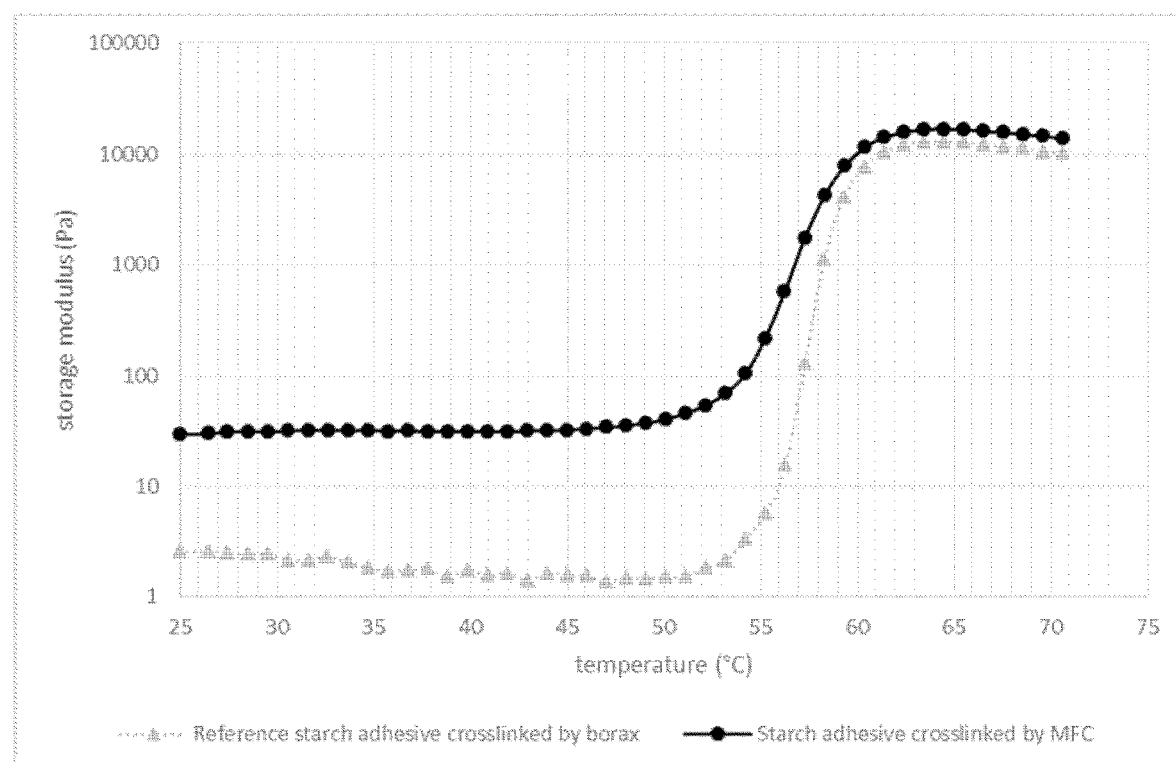

compositions, the microfibrillated cellulose primarily functions as a crosslinking agent (while it is by no means excluded that the microfibrillated cellulose additionally has other functionalities, such as acting as viscosity modifier and/or thixotropic additive), integrating the compound that (a) is capable of polymerizing or that has already partly or fully, polymerized, and that (b) has at least two groups available for hydrogen bonding, into a gel-like three-dimensional network.

22 Claims, 8 Drawing Sheets

(51) Int. Cl.
| | |
|---|---|
| B32B 29/08 | (2006.01) |
| C08J 3/00 | (2006.01) |
| C09J 103/02 | (2006.01) |
| D21J 1/08 | (2006.01) |
| C08L 1/02 | (2006.01) |
| C08L 29/04 | (2006.01) |
| C09D 101/02 | (2006.01) |
| C09D 129/04 | (2006.01) |
| C09J 101/02 | (2006.01) |
| C09J 129/04 | (2006.01) |

(52) U.S. Cl.
CPC ............ *C08L 29/04* (2013.01); *C09D 101/02* (2013.01); *C09D 129/04* (2013.01); *C09J 101/02* (2013.01); *C09J 103/02* (2013.01); *C09J 129/04* (2013.01); *D21J 1/08* (2013.01); *C08J 2303/02* (2013.01); *C08J 2401/02* (2013.01)

(56) References Cited

U.S. PATENT DOCUMENTS

| | | | |
|---|---|---|---|
| 3,294,716 | A | 12/1966 | Pinney et al. |
| 3,434,901 | A | 3/1969 | Griffiths et al. |
| 4,341,807 | A | 7/1982 | Turbak et al. |
| 4,374,702 | A | 2/1983 | Turbak et al. |
| 4,481,077 | A | 11/1984 | Herrick |
| 6,964,703 | B2 | 11/2005 | Geeroms |
| 10,337,146 | B2 | 7/2019 | Holtan et al. |
| 11,332,647 | B2 | 5/2022 | Holtan et al. |
| 2010/0291822 | A1 | 11/2010 | Netravali |
| 2011/0081554 | A1 | 4/2011 | Ankerfors et al. |
| 2012/0132383 | A1 | 5/2012 | Laine et al. |
| 2012/0219816 | A1 | 8/2012 | Heiskanen et al. |
| 2013/0025920 | A1* | 1/2013 | Shimizu .............. C08L 1/08 522/170 |
| 2015/0064491 | A1* | 3/2015 | Phipps .............. C09D 7/61 106/447 |
| 2015/0233058 | A1 | 8/2015 | Neumann |
| 2016/0215179 | A1* | 7/2016 | Sumnicht .............. C08L 1/02 |
| 2017/0121908 | A1 | 5/2017 | Holtan et al. |
| 2017/0204567 | A1* | 7/2017 | Yu .............. C09J 129/04 |
| 2020/0248042 | A1 | 8/2020 | Holtan et al. |

FOREIGN PATENT DOCUMENTS

| | | |
|---|---|---|
| CN | 105542676 A | 5/2016 |
| EP | 1101809 A1 | 5/2001 |
| EP | 2799618 A1 | 11/2014 |
| EP | 3395837 A1 | 10/2018 |
| JP | 2008-106178 A | 5/2008 |
| JP | 2011-516739 A | 5/2011 |
| JP | 2017-516926 A | 6/2017 |
| WO | WO-2006/079512 A1 | 8/2006 |
| WO | WO-2007/091942 A1 | 8/2007 |
| WO | WO-2009/123560 A1 | 10/2009 |
| WO | WO-2014/022666 A1 | 2/2014 |
| WO | WO-2015/180844 A1 | 12/2015 |
| WO | WO-2015180844 A1 * 12/2015 .......... B01F 17/0028 |  |
| WO | WO-2016/036632 A1 | 3/2016 |
| WO | WO-2017/111103 A1 | 6/2017 |
| WO | WO-2018/083590 A1 | 5/2018 |

OTHER PUBLICATIONS

CN-104558996-A, English translation (Year: 2015).*
Jonjankiat, Effect of Microcrystalline Cellulose from Bagasse on the Adhesion Properties of Tapioca Starch and/or Polyvinyl alcohol based Adhesives (Year: 2010).*
H. Xu et al., Robust and Flexible Films from 100% Starch Cross-Linked by Biobased Disaccharide Derivative; ACS Sustainable Chem. Eng., 3:2631- 2639, (2015).
International Search Report, PCT/EP2018/072008, dated Nov. 16, 2018, 4 pages.
International Search Report, PCT/EP2018/072017, dated Sep. 27, 2018, 4 pages.
Jonjankiat, Sunan, Effect of Microcrystalline Cellulose from Bagasse on the Adhesion Properties of Tapioca Starch and/or Polyvinyl alcohol based Adhesives, (A Thesis Submitted in Partial Fulfillment of the Requirements for the Degree of Master of Science in Packaging Technology), 147 pages, (2010) [Retrieved from the Internet: URL:http://kb.psu.ac.th/psukb/bitstream/2010/8532/1/344971.pdf] [retrieved on Oct. 12, 2017].
López-Suevos, F. et al., DMA analysis and wood bonding of PVAc latex reinforced with cellulose nanofibrils, Cellulose, Kluwer Academic Publishers (Dordrecht), NL, 17(2):387-398, (2010).
Written Opinion, PCT/EP2018/072008, dated Nov. 16, 2018, 5 pages.
Written Opinion, PCT/EP2018/072017, dated Sep. 27, 2018, 5 pages.

* cited by examiner

MICROFIBRILLATED CELLULOSE AS A CROSSLINKING AGENT

FIELD OF THE INVENTION

The present invention relates to a composition for use as an adhesive, paint, coating, (surface) size, resin, composite, gel or hydrogel, said composition comprising microfibrillated cellulose ("MFC"). In addition to microfibrillated cellulose, these compositions comprise at least one solvent, said solvent preferably comprising or consisting of water, and at least one compound that is (a) capable of polymerizing, or has already partly or fully, polymerized, and that (b) has at least two groups available for hydrogen bonding, preferably OH groups, that are capable of crosslinking with at least one functional group of the microfibrillated cellulose, preferably a functional group selected from hydroxyl group, carboxyl group, aldehyde group or ether or ester group.

In these compositions, the microfibrillated cellulose primarily functions as a crosslinking agent (while it is by no means excluded that the microfibrillated cellulose additionally has other, additional, functionalities, such as acting as viscosity modifier and/or thixotropic additive), integrating the compound that (a) is capable of polymerizing or that has already partly or fully, polymerized, and that (b) has at least two groups available for hydrogen bonding, preferably resulting in a gel-like three-dimensional network.

In particular, the microfibrillated cellulose allows for at least partially, preferably fully, replacing potentially disadvantageous commonly used cross-linkers such as, in particular, borax.

Furthermore, in preferred embodiments, the composition comprises no, or only trace amounts, of a cross-linking agent other than microfibrillated cellulose, in particular no boric acid or derivatives thereof, in particular no, or only trace amounts of borax.

In preferred embodiments, taken together, said "traces" of cross-linking agents other than MFC amount to less than 1000 ppm, preferably less than 500 ppm, further preferably less than 200 ppm, further preferably less than 100 ppm.

Correspondingly, in embodiments of the present invention, said composition for use as an adhesive, paint, coating, (surface) sizing agent, resin, composite, gel or hydrogel results in a crosslinked composition.

BACKGROUND OF THE INVENTION

Compositions that comprise at least one solvent, e.g. water, and at least one compound that is (a) capable of polymerizing, or has already partly or fully, polymerized, and that (b) has at least two groups available for hydrogen bonding, preferably OH groups, are of practical relevance in a variety of applications, in which a compound needs to at least partially cure, for example in adhesives, paints, coatings, surface sizing agents, resins, gels, composite gels, absorbents, hydrogels etc.

In some of these applications, a cross-linker is commonly used to achieve curing or better bonding between the molecules of the composition. However, such cross-linkers commonly have at least one, or any combination (including all), of the following drawback(s):
increased or undesirable levels of toxicity
other potentially hazardous (chemical) properties
negative impact on the environment
no or only limited biodegradability.

For example, CN 103 590 281 discloses a surface sizing solution that comprises a cross-linked product of nanofibrillated cellulose (NFC), starch and a cross-linking agent, and water. The NFC is based on single microfibrils of cellulose having a length of 100-2000 nm and a diameter of 3-200 nm obtained through defibrillating of cellulose raw materials, wherein the contents, in parts by weight on absolute dry basis, of the NFC, the starch and the cross-linking agent are 0.1-10 parts, 85-99.75 parts, and 0.15-5 parts respectively.

EP 1 101 809 discloses adhesives that have a dry solids content of at least 40% and comprise, in addition to "typical" adhesive components such as soda, borax, sodium hydroxide, protein, the following ingredients: a dispersion of starch, and a filler which is calcium carbonate. The starch-based adhesive of this composition was tested and found to be particularly useful in paper and corrugated board applications, in addition good results have been obtained in lamination.

U.S. Pat. No. 6,964,703 discloses starch-based adhesive paste composition comprising a mixture of a carrier paste and a main paste, each paste comprising starch being native starch or chemically modified starch, or any mixture thereof. The composition further comprises water, and sodium borate, wherein the total amount of starches in the main paste ranges from 25 to 50 wt %, based on the total amount of the main paste, and sodium borate (calculated as anhydrous borax) is present in an amount ranging from 0.3 to 3 wt based on the amount of the starch (dry substance) in the main paste;

US 2015/0233058 discusses drawbacks associated with the use of borax as a cross-linking agent in starch-based adhesives (see, for example, paragraph [0022] of US 2015/0233058) and proposes to use sodium aluminate as a cross-linker instead.

A scientific paper by H. Xu et al ("Robust and Flexible Films from 100% Starch Cross-Linked by Biobased Disaccharide Derivative"; ACS Sustainable Chem. Eng 2015, 3, 2631-2639) discloses the use of oxidized sucrose as a cross-linker in thin starch films.

Overall, it is generally believed that borax, which is commonly used as cross-linker in a variety of applications, including coatings and adhesives, will need to be partly or fully substituted, for environmental concerns, among others.

On the other hand, known cross-linkers, for example borax, are associated with one or more of the following (perceived) advantages, some (or most) of which should also be met by any replacement cross-linker:
provides the required viscosity ("thickness") and structure to the viscous composition
increases tack of the viscous composition when used as an adhesive;
improves film forming of the viscous composition on a substrate
improves water holding/water retention properties of the viscous composition Therefore, one object of the present invention is to provide compositions for use as an adhesive, paint, coating, (surface) size, resin, composite, gel or hydrogel or the like, in which composition commonly used cross-linkers that are associated with one or more of the drawbacks as outlined above, are fully or at least partially replaced with a cross-linker that ideally has none of the drawbacks outlined above or at least has less pronounced drawbacks, while retaining most, if not all, of the (perceived) advantages of the commonly used cross-linkers, as also outlined above.

SUMMARY OF THE INVENTION

In accordance with a first aspect of the present invention, this problem and others is/are solved by a composition for use as an adhesive, paint, coating, (surface) size, resin, gel, composite gel, absorbent or hydrogel, among others, said composition comprising:

microfibrillated cellulose;

at least one solvent, at least one compound that is (a) capable of polymerizing, or has already partly or fully polymerized, and that (b) has at least two groups available for hydrogen bonding, preferably OH groups, that are capable of crosslinking with at least one functional group of the microfibrillated cellulose.

In embodiments of the invention, the at least one functional group of the microfibrillated cellulose is selected from the groups of hydroxyl groups, carboxyl groups, ester groups, ether groups, aldehyde functionality.

In embodiments of the invention, the composition comprises no cross-linking agent other than microfibrillated cellulose, in particular comprises no borax or comprises only trace amounts of borax.

In further embodiments, the composition comprises no or comprises only trace amounts of boric acid, glyoxal, glutaraldehyde, formaldehyde, citric acid or (poly)carboxylic acids, N,N-methylenebisacrylamide, dicaproxypropylene succinate, aldehyde based or oxidized polysaccharides, bis-benzidine-2,2'-disulfonic acid, 1,5-difluoro-2,4-dinitrobenzene, dimethyl adipate, epoxy, organic peroxides, trisodium citrate, phosphorous oxychloride, chlorohydrins, salts or derivatives of trimetaphosphate (TMF), e.g. sodium trimetaphosphate, sodium tripolyphosphates, polymetaphosphates (e.g. hexameta-phosphate), POCl3, biphenyl compounds, N,N,-dimethylol-imidzolidon-2 (DMEU), cyanuric chloride, adipate, adipic acetic mixed anhydride, adipic acid/acetic acid, epichlorohydrin, sodium aluminate, divinylbenzene, divinylsulfone, or salts thereof.

In preferred embodiments, taken together, said "traces" of cross-linking agents other than MFC amount to less than 1000 ppm, preferably less than 500 ppm, further preferably less than 200 ppm, further preferably less than 100 ppm.

In embodiments of the invention, the at least one compound that is (a) capable of polymerizing, or has already partly or fully polymerized, and that (b) has at least two groups available for hydrogen bonding, preferably OH groups, that are capable of crosslinking with at least one functional group of the microfibrillated cellulose is partly or fully polymerized and is a polymer that has at least two groups available for hydrogen bonding.

In embodiments of the invention, the at least one solvent is polar solvent, further preferably a polar protic solvent, in particular an alcohol, an organic acid or water, or any combination thereof.

In embodiments of the invention, the at least one solvent is present in an amount of from 20% by weight, relative to the overall weight of the composition to 90% by weight, preferably from 30% to 80%, further preferably from 40% to 75% w/w.

In many compositions as used herein, the cross-linking agent is used in combination with an alkaline or the composition comprises an alkaline for other reasons. The inventors have surprisingly found that the amount of alkaline in the composition can generally be reduced (vis-à-vis compositions that are otherwise the same but comprise a cross-linking agent other than MFC) when MFC replaces all or parts of the crosslinking agent. Therefore, in embodiments of the invention, the composition comprises an alkaline, preferably alkali hydroxide, further preferably NaOH, in a total amount, that is from 0.05% w/w to 0.8% w/w, preferably 0.1% w/w to 0.5%, w/w further preferably from 0.1.% w/w to 0.3%, w/w, of the overall composition.

Microfibrillated cellulose (also known as "reticulated" cellulose or as "superfine" cellulose, or as "cellulose nanofibrils", among others) is a cellulose-based product and is described, for example, in U.S. Pat. Nos. 4,481,077, 4,374, 702 and 4,341,807.

In accordance with the present invention, microfibrillated cellulose has at least one reduced length scale (diameter, fiber length) vis-à-vis non-fibrillated cellulose. In (non-fibrillated) cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 μm (with the length of these fibres being even greater). When the cellulose fibres are microfibrillated, a heterogeneous mixture of "released" fibrils with cross-sectional dimensions and lengths from nm to μm may result. Fibrils and bundles of fibrils may co-exist in the resulting microfibrillated cellulose.

In embodiments of the present invention, the microfibrillated cellulose has at least one length scale, i.e. fibril diameter and/or fibril length, that is reduced vis-à-vis the fiber diameter and/or fiber length of the non-fibrillated cellulose; preferably wherein the diameter of the microfibrillated cellulose fibrils making up the microfibrillated cellulose of the present invention is in the nanometer range. i.e. from 1 nm to 1000 nm, preferably, and on average, from 10 nm to 500 nm.

In the microfibrillated cellulose ('MFC') as described throughout the present disclosure, individual fibrils or fibril bundles can be identified and easily discerned by way of conventional optical microscopy, for example at a magnification of 40×, or by electron microscopy.

In embodiments of the present invention, the microfibrillated cellulose is present in concentrations of from 0.001% dry matter, relative to the overall weight of the composition to 10% dry matter, preferably from 0.01% to 10%, preferably from 0.05% to 5%, further preferably 0.05% to 2%, further preferably 0.05% to 0.15%.

In accordance with the present invention, the term "dry matter" (also: "solids content") refers to the amount of microfibrillated cellulose remaining if all the solvent (typically water) is removed. The amount is then calculated as weight % relative to the overall weight of the adhesive composition (including solvent, compound that is capable of polymerizing, or has already partly or fully polymerized, e.g. starch, and other adjuvants, if present.)

In alternative embodiments of the invention, the amount of microfibrillated cellulose in said composition is from 0.02% w/w, relative to the overall weight of the composition to 8% w/w, preferably from 0.05% w/w to 5% w/w, further preferably from 0.05% w/w to 2% w/w, further preferably from 0.05% w/w to 0.5% w/w, further preferably from 0.05% w/w to 0.15% w/w. In alternative embodiments of the invention, the amount of microfibrillated cellulose in said composition is from 0.001% w/w, relative to the overall weight of the composition to 0.03% w/w, preferably from 0.003% w/w to 0.03% w/w, further preferably from 0.007% w/w to 0.03% w/w, further preferably from 0.01% w/w to 0.03% w/w.

In accordance with the present invention, providing the amount of MFC as concentration "dry matter" is the same as providing the amount as "% w/w" relative to the overall weight of the composition.

The inventors have surprisingly found that comparatively low amounts of MFC can be used in the claimed compositions, for example 10% w/w or less, or 5% w/w or less, while still achieving the advantages that MFC has as a cross-linker, which advantages are described throughout the disclosure. Generally, the skilled person wants to keep the amount of any additive needed as low as possible. Generally, if the amount of MFC is chosen too low, for example below 0.001% w/w, the cross-linked network may not be strong enough. Or, at even lower amounts, the amount of fibrils may be too low to form a continuous network. On the other hand, if too much MFC is present, for example more than 10% w/w, then the viscosity may be too high and the overall composition may be difficult to process.

In embodiments of the invention, the MFC has a Schopper-Riegler (SR) value as obtained in accordance with the standard as defined in EN ISO 5267-1 (in the version of 1999) of below 95, preferably below 90, or, in the alternative, cannot be reasonably measured in accordance with the Schopper-Riegler method, as the MFC fibers are so small that a large fraction of these fibers simply passes through the screen as defined in the SR method.

In accordance with the invention, MFC not only acts as a cross-linking agent in the composition, but the microfibrillated cellulose (also) acts as a viscosity modifier and/or stabilizer, in particular as a thixotropic additive.

In embodiments of the present invention, in particular for starch-based adhesives, the pH value of the composition is at least 8, preferably at least 10.

In other embodiments, in particular for compositions comprising PVA, the pH value of the composition is from 2 to 6, preferably from 3.5 to 5.5.

In embodiments of the present invention, the compound that is (a) capable of polymerizing, or has already partly or fully polymerized, and that (b) has at least two groups available for hydrogen bonding, preferably OH groups, that are capable of crosslinking with at least one functional group of the microfibrillated cellulose in the composition is selected from the following compounds: at least one starch or starch derivative (in particular dextrin), at least one polyvinyl alcohol, at least one polyvinyl acetate, at least one polyethylene or polypropylene glycol, at least one polysaccharide, at least one carbohydrate, at least one polypeptide, at least one acrylate, at least one acrylamide, at least one ethylene oxide, at least one propylene oxide, at least one glycol, at least one polyether, at least one polyester, at least one polyol, at least one epoxy resin, at least one polyurethane, at least one polyacrylate such as polymethylmethacrylate (PMMA), at least one polyurea or at least one carbamide.

In embodiments of the present invention, the compound that is (a) capable of polymerizing, or has already partly or fully polymerized, and that (b) has at least two groups available for hydrogen bonding, preferably OH groups, that are capable of crosslinking with at least one functional group of the microfibrillated cellulose in the composition, is at least one starch or starch derivative, preferably wherein the ratio of microfibrillated cellulose to starch or starch derivative is from 1:1500 to 1:50, preferably from 1:1500 to 1:100, preferably from 1:500 to 1:100, further preferably from 1:400 to 1:200.

In accordance with a second aspect of the present invention, the above-discussed problem(s) and others is/are solved by a crosslinked composition obtained or obtainable from a composition according to any of the preceding embodiments.

In accordance with the present invention, when reference is made to a "crosslinked" composition, a composition is meant that has fully cured and/or crosslinked and is ready for use, in particular for use as an adhesive, paint, coating, surface sizing, resin, gel, composite gel, adsorbent or as hydrogel.

In embodiments of the present invention, said crosslinked composition obtained or obtainable from a composition according to any of the preceding embodiments has a viscosity that is stable over time, in particular that does not increase or decrease by more than 20%, preferably not by more than 15%, further preferably not more than 5%, over a period of 24 hours, preferably 48 hours, under standard conditions (33° C., 1 bar), if left alone (i.e. storage conditions), immediately after conclusion of the crosslinking.

In embodiments of the present invention, said crosslinked composition obtained or obtainable from a composition according to any of the preceding embodiments has a gelation temperature that is reduced vis-à-vis the gelation temperature of an otherwise identical composition that does not comprise microfibrillated cellulose.

In accordance with the present invention, in said crosslinked composition, two or more molecules (monomers, partly polymerized oligomers or polymers) of the compound that is (a) capable of polymerizing, or has already partly or fully polymerized, and that (b) has at least two groups available for hydrogen bonding, preferably OH groups, that are capable of crosslinking with at least one functional group of the microfibrillated cellulose are crosslinked with each other via one or more units of microfibrillated cellulose.

As outlined in more detail below, due to the specific structure, morphology and surface chemistry of microfibrillated cellulose fibrils (providing functional groups), the resulting three-dimensional cross-linked network of microfibrillated cellulose together with the compound that is capable to react with the functional groups of the MFC fibrils, in particular hydroxyl or carboxyl groups (i.e. that is capable to be crosslinked) provides a particularly stable structure, in particular in the presence of water, since a gel-like structure (presumably a hydrogel) is formed that is stable against shear, has increased viscosity and/or water retention and is stable over long periods of time, for example does not significantly increase or decrease in viscosity.

In this context, references are made to Example 4 and Example 10, which show, among others, that high shear viscosity breakdown of MFC crosslinked starch was noticeably reduced compared to that of starch crosslinked with borax. In the MFC crosslinked starch composition, the molecules are strongly bonded with each other, increasing the mechanical strength of the molecule, keeping the swollen granules intact and, hence, prevent loss of viscosity and provide resistance to mechanical shear impact. The strength of the H-bonds of the predominant hydroxyl groups of MFC to the adjacent hydroxyl (or COOH) groups of, in this example, starch is increased by the physical fibril network structure of MFC.

Without wishing to be bound by theory, it is believed that this network structure is based on chemical and/or physical (ionic) cross linkages between the microfibrillated cellulose units and the compound that is capable to react with the OH/COOH or CHO groups of the MFC fibrils by way of hydrogen bonding. In particular, it is believed that microfibrillated cellulose is an efficient thickener in polar solvent systems, in particular in water, and builds large three dimensional networks of fibrils which are stabilized by hydrogen bonds.

In addition to the ability of MFC to chemically crosslink polymers by H-bonding, MFC also has the ability to immobilize polymers in a network of entangled fibrils. This physical interaction will facilitate and strengthen the hydrogen bonds. Dependent on the pH and reaction conditions, the MFC network can be adjusted to be less (low pH) or more extended (high pH), due to electrostatic repulsion forces between the fibrils.

MFC is able to both chemically and physically crosslink to provide stable hydrogels, which are 3D-polymeric networks that are able to retain large volumes of water. If water is used as the solvent, MFC is also a hydrogel in itself, which does not dissolve in water due to the solid fibril network facilitating intermolecular crosslinking. By way of this characteristic, MFC is different to other cellulose products (derivatives), such as CMC, that tend to form intramolecular rather than intermolecular crosslinking. It is believed that MFC has the ability to interact with polymers (compounds) through multiple H-bonds. MFC may thereby stabilize the system, with both physical fibrils/fibril aggregates and with H-bonding groups pointing outwards.

While the capability of MFC to "cross-link" is believed to be the primary reason why the viscous compositions according to the present invention have improved performance properties, including viscosity stability under high shear (in particular when replacing borax), depending on the specific application and/or the presence or absence of further components, MFC: additionally may have other functionalities or effects (for example viscosity modifying, thixotropic properties, stabilizing etc.).

In accordance with the present invention, the viscous composition comprises at least one solvent that preferably comprises or essentially consists of water, wherein said solvent is present from 20% by weight, relative to the overall weight of the composition to 90% by weight, preferably from 30% to 80%, further preferably from 40% to 75% w/w.

In embodiments of the present invention, the viscous composition comprises no cross-linking agent other than MFC, in particular comprises no borax or comprises only trace amounts of borax or boric acid.

The viscous composition preferably comprises no or only trace amounts of glyoxal, glutaraldehyde, formaldehyde, citric acid or (poly)carboxylic acids, N,N-methylenebisacrylamide, dicaproxypropylene succinate, aldehyde based or oxidized polysaccharides, bis-benzidine-2,2'-disulfonic acid, 1,5-difluoro-2,4-dinitrobenzene, dimethyl adipate, epoxy, organic peroxides, trisodium citrate, phosphorous oxychloride, chlorohydrins, salts or derivatives of trimetaphosphate (TMF), e.g. sodium trimetaphosphate, sodium tripolyphosphates, polymetaphosphates (e.g. hexametaphosphate), POCl3, biphenyl compounds, N,N,-dimethylolimidzolidon-2 (DMEU), cyanuric chloride, adipate, adipic acetic mixed anhydride, adipic acid/acetic acid, epichlorohydrin, sodium aluminate, divinylbenzene, divinylsulfone, or salts thereof.

In preferred embodiments, taken together, said "traces" amount to less than 1000 ppm, preferably less than 500 ppm, further preferably less than 200 ppm, further preferably less than 100 ppm.

In accordance with the present invention, although "borax" and boric acid are generally understood to not be the same compound; [borax is a salt of boric acid, i.e. borax is sodium (tetra)borate, while boric acid is hydrogen borate], whenever the term "borax" is used, the term refers to boric acid and its alkaline metal salts. In particular, a number of related minerals or chemical compounds that differ primarily in their crystal water content are referred to as "borax" and are included within the scope of the present invention, in particular the decahydrate. Commercially sold borax is typically partially dehydrated. In accordance with the present invention the term "borax" also encompasses boric acid or borax derivatives, e.g boric acid or borax that has been chemically or physically modified.

In particular, borax in accordance with the present invention comprises or essentially consists of the following minerals or chemical compounds that differ in their crystal water content:

Anhydrous borax ($Na_2B_4O_7$)
Borax pentahydrate ($Na_2B_4O_7 \cdot 5H_2O$)
Borax decahydrate ($Na_2B_4O_7 \cdot 10H_2O$),
or combinations thereof.

The decahydrate may also be represented as $Na_2[B_4O_5(OH)_4]\cdot 8H_2O$, since borax contains the $[B_4O_5(OH)_4]^{2-}$ ion. "Borax" may be converted to boric acid and other borates, which have many applications. Its reaction with hydrochloric acid to form boric acid is:

$$Na_2B_4O_7 \cdot 10H_2O + 2\ HCl \rightarrow 4H_3BO_3 + 2\ NaCl + 5H_2O$$

Boric acid is also known as hydrogen borate, boracic acid, orthoboric acid and acidum boricum.

The reaction of a compound that is capable to cross-link with microfibrillated cellulose (here: starch) is believed to react with the R—OH groups of the microfibrillated cellulose according to the following mechanism:

$$NaOH + B(OH)_3 \rightarrow Na^+ + B(OH)_4^-$$

Crosslinking Mechanism:

$$Na^+ + B(OH)_4^- + R\text{—}OH \rightarrow Na^+ + R\text{—}O\text{—}B(OH)_3^- + H_2O$$

$$Na^+ + R\text{—}O\text{—}B(OH)_3^- + R1\text{-}OH \rightarrow Na^+ + R\text{—}O\text{—}B(OH)_2O\text{—}R1 + H_2O$$

R=starch molecule
R1=new starch molecule

Representative uses of borax, in which uses borax can be replaced with MFC, in accordance with the present invention, are given in the following table:

| Exemplary product | Exemplary application |
|---|---|
| Borated dextrin adhesives | Toilet/kitchen paper rolls + any other rolls for wrapping things around |
| Casein adhesives (for labelling) | Glass bottles |
| Starch & derivate adhesives | Labelling of glass bottles wallpaper, cardboard, corrugated board |
| Polyvinyl alcohol adhesives | Cardboard, corrugated board + all kinds of tubes: toilet paper, foils . . . |
| Magnesium Phosphate adhesives | for adhesives grouts & repair products |
| Hydrogels | Medical: Glucose sensor |
| Gels | Self-healing |
| Tissue Modifier | Artificial tissue |

Without wishing to be bound by theory, it is believed that the viscosity breakdown of MFC crosslinked starch is reduced compared with that of starch crosslinked with borax. By crosslinking starch with MFC, the starch molecules are strongly bonded with each other, increasing the mechanical strength of the overall mixture, keeping the swollen granules intact and, hence, prevent loss of viscosity and provide resistance to mechanical shear impact. The strength of the H-bonds of the predominant hydroxyl groups of MFC to the adjacent hydroxyl groups of starch is increased by the physical fibril network structure of MFC.

In accordance with a third aspect of the present invention, the above-mentioned problem(s) and others is/are solved by a use of the crosslinked composition according to the embodiments above, or as obtained or obtainable from any of the compositions according to the embodiments above, as an adhesive, paint, coating, (surface) size, composite, resin, paste, food thickener or additive, gel or hydrogel or as an absorbent, preferably as an adhesive composition.

In accordance with the present invention a "size" or "sizing" is any one substance that is applied to, or incorporated into, other materials—especially papers and textiles—to act as a protective filler or glaze. Sizing is used in papermaking and textile manufacturing to change the absorption and wear characteristics of those materials.

In accordance with a fourth aspect of the present invention, the above-mentioned problem(s) and others is/are solved by a process for preparing a crosslinked composition for use as an adhesive, paint, coating, surface size, composite, resin, paste, food thickener or additive, gel, hydrogel or absorbent, among others, which process comprises the steps of:
  (i) mixing at least one compound that is (a) capable of polymerizing, or has already partly or fully polymerized, and that (b) has at least two groups available for hydrogen bonding, preferably OH groups, that are capable of crosslinking with at least one functional group of the microfibrillated cellulose, with at least one solvent, in particular a solvent comprising or essentially consisting of water, to result in a mixture having a predetermined viscosity;
  (ii) optionally adding one or more additives to the mixture from (i)
  (iii) during or after step (i), or during or after optional step (ii), adding microfibrillated cellulose, which is preferably present in a solvent, preferably a solvent comprising or essentially consisting of water, wherein the solids content of said microfibrillated cellulose in said solvent is from 0.1% dry weight to 20% dry weight, preferably from 2% dry weight to 15% dry weight, and dispersing the microfibrillated cellulose in the mixture of (i) or (ii) until a homogeneous mixture is obtained;
  (iv) after step (iii): at least partially crosslinking, preferably fully crosslinking, the microfibrillated cellulose with the compound that is (a) capable of polymerizing, or has already partly or fully polymerized, and that (b) has at least two groups available for hydrogen bonding, preferably OH groups, that are capable of crosslinking with at least one functional group of the microfibrillated cellulose, at a temperature of from 10° C. to 100° C., preferably from 25° C. to 95° C.

In accordance with a fifth aspect of the present invention, the above-mentioned problem(s) and others is/are solved by the use of microfibrillated cellulose as a cross-linking agent in the composition of any of the embodiments discussed above, preferably use of MFC as a cross-linking agent in adhesive compositions, in coatings, in sizing compositions, in gels, in hydrogels, in resins, in composites, in pastes, as thickener or as food additives, or in absorbents.

In embodiments of the invention, microfibrillated cellulose is used as a replacement for borax in compositions, in particular in adhesive compositions, in coatings, in sizing compositions, in gels, in hydrogels, in resins, in composites, in pastes, as thickener or as food additives, or in absorbents.

Without wishing to be bound by theory, it is believed that the (crosslinked) compositions of the present invention are particularly useful in these applications since the MFC not only forms stable networks that retain viscosity under shear and/or over time, but also since MFC stabilized networks have a higher water retention capacity than other polymeric and/or gel-like networks. It is generally seen as advantageous if a coating as applied onto a substrate (surface) releases water onto or even into said substrate.

Adhesives prepared with MFC cross-linked polymers, in particular with cross-linked starches have an improved rheological profile, which makes such adhesives particularly suitable for application on corrugating rolls and superior wet-bond strength (tack), in addition to improved viscosity stability in storage tank (see Example 4).

The use of MFC as a cross linker results in (starch) adhesives with improved viscosity, improved viscosity stability and improved texture. Less adhesive can be applied, resulting in stronger bonds, improved production speeds and flatter boards (see Example 11).

The compositions in accordance with the present invention, or as obtained or obtainable by the process of the present invention, and/or the use of MFC in compositions (as a crosslinking agent and/or as a replacement for borax) in accordance with the present invention, is/are associated with at least one of the following advantages:
  Microfibrillated cellulose is well dispersible in viscous compositions, in particular such compositions comprising or essentially consisting of water as the solvent;
  Microfibrillated cellulose can be used to adjust the viscosity of the final composition and stabilize the same over time, in particular during storage and also in regard to resistance under high shear;
  Microfibrillated cellulose provides flexibility for viscosity corrections at any stage of the process;
  Microfibrillated cellulose provides thixotropic properties to the overall viscous composition, which means that higher overall viscosity may be tolerated; also: microfibrillated cellulose provides shear thinning properties to the overall viscous composition, which improves application properties;
  Microfibrillated cellulose provides a shorter texture (an improved rheological profile) for excellent application on corrugating rolls and superior wet-bond strength (tack) (reduction in adhesive consumption, stronger bonds, improved production speeds and flatter corrugated boards are then achieved).

DETAILED DESCRIPTION OF THE INVENTION

"Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

Microfibrillated cellulose (also known as "reticulated" cellulose or as "superfine" cellulose, or as "cellulose nanofibrils", among others) is a cellulose-based product and is described, for example, in U.S. Pat. Nos. 4,481,077, 4,374, 702 and 4,341,807. According to U.S. Pat. No. 4,374,702 ("Turbak"), microfibrillated cellulose has distinct properties vis-à-vis cellulose products not subjected to the mechanical treatment disclosed in U.S. Pat. No. 4,374,702. In particular, the microfibrillated cellulose described in these documents has reduced length scales (diameter, fiber length), improved water retention and adjustable viscoelastic properties. MFC with further improved properties and/or properties tailor-made for specific applications is known, among others, from WO 2007/091942 and WO 2015/180844.

In cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 μm (with the length of these fibres being even greater). When the cellulose fibres are microfibrillated, a heterogeneous mixture of "released" fibrils with cross-sectional dimensions and lengths from nm to μm may result. Fibrils and bundles of fibrils may co-exist in the resulting microfibrillated cellulose.

In the microfibrillated cellulose ('MFC') as described throughout the present disclosure, individual fibrils or fibril bundles can be identified and easily discerned by way of conventional optical microscopy, for example at a magnification of 40×, or by electron microscopy.

In embodiments, the microfibrillated cellulose in accordance with the present invention is characterized, among others, by one or more of the following features:

The microfibrillated cellulose results in a gel-like dispersion that has a zero shear viscosity, $\eta_0$, of at least 2000 Pa·s, preferably at least 3000 Pa·s, preferably at least 4000 Pa·s, preferably at least 5000 Pa·s, preferably at least 6000 Pa·s, further preferably at least 7000 Pa·s, as measured in polyethylene glycol (PEG) as the solvent, and at a solids content of the MFC of 0.65%.

The zero shear viscosity, no ("viscosity at rest") is a measure for the stability of the three-dimensional network making up the gel-like dispersion.

The "zero shear viscosity" as disclosed and claimed herein is measured as described in the following. Specifically, the rheological characterization of the MFC dispersions ("comparative" and "in accordance with the invention") was performed with PEG 400 as the solvent. "PEG 400" is a polyethylene glycol with a molecular weight between 380 and 420 g/mol and is widely used in pharmaceutical applications and therefore commonly known and available.

The rheological properties, in particular zero shear viscosity was/were measured on a rheometer of the type Anton Paar Physica MCR 301. The temperature in all measurements was 25° C. and a "plate-plate" geometry was used (diameter: 50 mm). The rheological measurement was performed as an oscillating measurement (amplitude sweep) to evaluate the degree of structure in the dispersions and as rotational viscosity measurements, in which case the viscosity was measured as a function of the shear rate to evaluate the viscosity at rest (shear forces 0), as well as the shear thinning properties of the dispersions. The measurement method is further described in PCT/EP2015/001103 (EP 3 149 241).

In embodiments, the microfibrillated cellulose has a water holding capacity (water retention capacity) of more than 30, preferably more than 40, preferably more than 50, preferably more than 60, preferably more than 70, preferably more than 75, preferably more than 80, preferably more than 90, further preferably more than 100. The water holding capacity describes the ability of the MFC to retain water within the MFC structure and this again relates to the accessible surface area. The water holding capacity is measured by diluting the MFC samples to a 0.3% solids content in water and then centrifuging the samples at 1000 G for 15 minutes. The clear water phase was separated from the sediment and the sediment was weighed. The water holding capacity is given as (mV/mT)−1 where mV is the weight of the wet sediment and mT is the weight of dry MFC analyzed. The measurement method is further described in PCT/EP2015/001103 (EP 3 149 241).

In principle, any type of microfibrillated cellulose (MFC) can be used in accordance with the present invention, as long as the fiber bundles as present in the original cellulose pulp are sufficiently disintegrated in the process of making MFC so that the average diameter of the resulting fibers/fibrils is in the nanometer-range and therefore more surface of the overall cellulose-based material has been created, vis-à-vis the surface available in the original cellulose material. MFC may be prepared according to any of the processes known to the skilled person.

In accordance with the present invention, there is no specific restriction in regard to the origin of the cellulose, and hence of the microfibrillated cellulose. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g. from tunicates.

In a preferred embodiment, wood-based materials are used as raw materials, either hardwood or softwood or both (in mixtures). Further preferably softwood is used as a raw material, either one kind or mixtures of different soft wood types. Bacterial microfibrillated cellulose is also preferred, due to its comparatively high purity.

In principle, the microfibrillated cellulose in accordance with the present invention may be unmodified in respect to its functional groups or may be physically modified or chemically modified, or both.

Chemical modification of the surface of the cellulose microfibrils may be achieved by various possible reactions of the surface functional groups of the cellulose microfibrils and more particularly of the hydroxyl functional groups, preferably by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

The cellulose microfibrils may, in principle, also be modified by a physical route, either by adsorption at the surface, or by spraying, or by coating, or by encapsulation of the microfibril. Preferred modified microfibrils can be obtained by physical adsorption of at least one compound. The MFC may also be modified by association with an amphiphilic compound (surfactant).

In preferred embodiments, the microfibrillated cellulose is non-modified or physically modified, preferably non-modified.

In embodiments of the invention, the microfibrillated cellulose is a non-modified (native) microfibrillated cellulose, preferably a non-modified microfibrillated cellulose derived from plant material.

Without wishing to be bound by theory, it is believed that microfibrillated cellulose is a highly efficient thickener in solvent systems, in particular water systems and builds large three dimensional networks of fibrils which are stabilized by hydrogen bonds. The fibrils of microfibrillated cellulose have hydroxyl groups on the surface that are fully dissociated (to form hydroxyl ions, O⁻), at a high pH and cause intra and inter-particular interactions, stabilizing the overall network (stabilizing by "chemical" and/or "physical" interactions). In addition, microfibrillated cellulose has high water holding capacity, which also is beneficial in many applications, for example for coatings and adhesives, since less water will penetrate the surface or substrate to which the viscous composition of the present invention is applied.

In a preferred embodiment of the present invention, the microfibrillated cellulose is prepared or obtainable by a process, which comprises at least the following steps:
(a) subjecting a cellulose pulp to at least one mechanical pretreatment step;
(b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose;
wherein the homogenizing step (b) involves compressing the cellulose pulp from step (a) and subjecting the cellulose pulp to a pressure drop.

The mechanical pretreatment step preferably is or comprises a refining step. The purpose of the mechanical pretreatment is to "beat" the cellulose pulp in order to increase the accessibility of the cell walls, i.e. to increase the surface area.

A refiner that is preferably used in the mechanical pretreatment step comprises at least one rotating disk. Therein, the cellulose pulp slurry is subjected to shear forces between the at least one rotating disk and at least one stationary disk.

Prior to the mechanical pretreatment step, or in addition to the mechanical pretreatment step, enzymatic (pre)treatment of the cellulose pulp is an optional additional step that may be preferred for some applications. In regard to enzymatic pretreatment in conjunction with microfibrillating cellulose, the respective content of WO 2007/091942 is incorporated herein by reference. Any other type of pretreatment, including chemical pretreatment is also within the scope of the present invention.

In the homogenizing step (b), which is to be conducted after the (mechanical) pretreatment step, the cellulose pulp slurry from step (a) is passed through a homogenizer at least once, preferably at least two times, as described, for example, in PCT/EP2015/001103, the respective content of which is hereby incorporated by reference.

In embodiments of the present invention, further additives may be used in the compositions according to the present invention, such as calcium chloride, sodium hydroxide, urea, sodium nitrate, thiourea and guanidine salts, some or all of which may be used as liquefiers to further control viscosity. These additives may be added at about 5-20% based on the overall weight. Improved cold-water resistance may be achieved by adding polyvinyl alcohol or polyvinyl acetate blends. These adhesives will also dissolve in hot water, which may be advantageous. Optimal moisture resistance may be achieved through the addition of thermosetting resins, such as urea formaldehyde or resorcinol formaldehyde.

Plasticizers are sometimes used to regulate the speed of drying. Common plasticizers include glycerin, glycols, sorbitol, glucose and sugar. These types of plasticizers may act as a hygroscopic agent to decrease the drying rate of the composition. Plasticizers based on saps, polyglycols and sulfonated oil derivates lubricate the layers within the dried adhesive and, thus, impart flexibility. Urea, sodium nitrate, salicylic acid and formaldehyde plasticize by forming a solid solution with the dried composition. All of these additives, any combination thereof, or only one such additive, may added in step (i) or in step (ii) of the process as described above.

Mineral fillers, such as kaolin clay, calcium carbonate and titanium dioxide, may be added in step (i), step (ii) or after step (iii), to reduce cost and control penetration into porous substrates. These additives may be added at concentrations of 5-50%.

Other additives that may be added in step (i), step (ii) or after step (iii), include but are not limited to preservatives, bleaches, and defoamers. Preservatives that are preferred to prevent microbial activity include formaldehyde (35% solids) at 0.2-1.0%, copper sulfate at about 0.2%, zinc sulfate, benzoates, fluorides and phenols. Preferred bleaching agents include sodium bisulfite, hydrogen and sodium peroxide, and sodium perborate. Organic solvents may be added to improve adhesion to waxed surfaces.

In accordance with the present invention, an "adhesive" is understood to be a material that is applied to the surfaces of articles to join these surfaces permanently by an adhesive bonding process. An adhesive is a substance capable of forming bonds to each of the two parts, wherein the final object consists of two sections that are bonded together. A particular feature of adhesives is the relatively small quantities that are required compared to the weight of the final object.

EXAMPLES

Example 1

Preparation of Microfibrillated Cellulose

MFC as in the compositions of the present invention is commercially available and commercialized, for example, by Borregaard as "Exilva Microfibrillated cellulose PBX 01-V", based on cellulose pulp from Norwegian spruce (softwood). Exemplary processes to obtain this MFC are described, among others in PCT/EP2015/001103 (WO 2015/180844). The disclosure of this earlier application is made part of the disclosure of the present invention in the context of any process for manufacturing MFC.

The MFC used in the examples is present as a paste, having a solids content of 10% (for the examples, in which microfibrillated cellulose is used as a cross-linker in starch-based adhesives) and 2% (for the examples, in which microfibrillated cellulose is used to cross-link PVA). The solvent was water.

Example 2

Preparation of an Adhesive Comprising Microfibrillated Cellulose

The process for preparing a starch based corrugated paperboard adhesive, cross-linked by MFC, is given below. The viscosities at different process steps were measured online by a viscometer, and controlled manually by measuring the Lory viscosity.

An adhesive in accordance with the present invention was prepared based on the following ingredients and manufactured according to the following steps:
    750 kg of primary water
    180 kg of primary wheat starch Stirring for 30 sec at a temperature of 36.5° C.
   100 kg of water
   16.5 kg Primary caustic soda
   80 kg of water
Stirring for 30 sec
Viscosity control value 1 is set to: 10 sec
Stirring for 840 sec
Viscosity control 2: 33.8 sec
   260 kg secondary water
   Disinfectant: 0.4 kg
Temperature 35° C.
   280 kg secondary wheat starch
Stirring for 30 sec
   20 kg of MFC (Exilva PBX 01-V)
Stirring for 600 sec
   21 kg of water
Viscosity control 3, final: 29.1 sec
The Lory viscosity was measured to be 26.5.

As is known to the skilled person, the Lory viscosity is measured with a Lory viscosity cup, here: Elcometer 2215/1, according to standards ASTM D 1084-D or ASTM D4212. This device consists of a conventional cylindrical cup with a needle fixed to the bottom. The cup is first dipped into the adhesive, which then empties through an escape hole. The flow time is measured as soon as the point of the needle appears. The pH of the final adhesive was 11.9.

Unless explicitly stated otherwise, all measurements as described herein were taken at standard laboratory conditions, i.e. a temperature of 25° C., an ambient pressure of standard pressure and at an ambient humidity of 50%.

The adhesive consists of a primary starch portion in which most of the granules were partially swollen, in which uncooked raw starch was suspended.

Microfibrillated cellulose was added under high speed stirring (1500 rpm), after the addition and inmix of the secondary portion of unswollen starch. Microfibrillated cellulose was easily dispersed in the mixture. The concentration of MFC in the final formulation is 0.12%. The dry mass fraction of the MFC crosslinker is 0.42% (the ratio polymer to crosslinker was 230 to 1).

Based on the presence of Microfibrillated Cellulose, the Lory viscosity of the adhesive did remain stable, and did not drop with increasing mixing time at high shear. Under alkaline conditions as present, the MFC is cross-linking the starch polysaccharide by hydrogen bonds and additionally stabilizes the mixture by forming a physical network composed of entangled fibrils, thus protecting the starch from high shear degradation, and also from further reaction (swelling) by caustic soda.

Example 3

Preparation of a Starch Based Adhesive Comprising Borax (Reference)

A reference adhesive was prepared based on the following ingredients and manufactured according to the following steps:
   750 kg of primary water
   180 kg of primary wheat starch
Stirring for 30 sec, temperature 36.5° C.
   100 kg of water
   16.5 kg Primary caustic soda
   80 kg of water
Stirring for 30 sec
Viscosity control 1: 10 sec
Stirring for 840 sec
Viscosity control 2: 33.8 sec
   260 kg secondary water
   Disinfectant: 0.4 kg
Temperature 35° C.
   280 kg secondary wheat starch
Stirring for 30 sec
   2.5 kg of borax
Stirring for 600 sec
Viscosity control 3, final: 28 sec
The pH of the final adhesive was 11.7.

Borax is added, after the addition and inmix of the secondary unswollen starch. The concentration of borax in the final formulation was 0.15%. The Lory viscosity of the starch adhesive with borax was decreasing readily with mixing time at high shear.

Example 4

Laboratory Tests of the Starch Adhesives Crosslinked by MFC or Borax

The determination of the curing temperature of the starch adhesive with borax and the starch adhesive with MFC was performed on a rheometer (Anton Paar Physica MCR 102). A concentric cylinder geometry was used. To determine the curing temperature, a temperature sweep from 25° C. to 70° was performed in the linear viscoelastic region i.e. at a deformation of 0.1% and frequency of 1 Hz. The storage modulus was measured as a function of temperature. The curing temperature was determined as the temperature of the onset of the steep increase in the storage modulus.

Without wishing to be bound by theory, it is believed that the MFC aggregates with reactive groups present on fibril-threads, form hydrogen bonds with polar (hydrophilic) functional groups on the polymers, for example starch polymers (and/or also itself). Thereby, MFC builds structures that, depending on reaction conditions such as concentration and time, temperature and pH, lead to stable gels, and, in particular, if the gels are formed in water, hydrogels.

FIG. 1 shows that the adhesive containing MFC as a crosslinker has a lower curing temperature than the adhesive containing borax as a crosslinker. The adhesive with MFC is a gel with a new and different structure compared to the reference adhesive with borax. It is believed that the formation of this gel is the result of strong intermolecular hydrogen bonds as well as physical entrapment of the starch molecules by entangled fibrils network. It is believed that the intermolecular H-linkages of the MFC/starch adhesive are so strong that they provide a composition with new properties versus the borax/starch network.

After curing of the starch adhesives, this new structure introduced by MFC was further evident, when it was found that the gel is more malleable and a softer textured gel compared to the borax crosslinked starch that is a self-standing and brittle viscoelastic hydrogel once it is cooled down.

Figure 2:
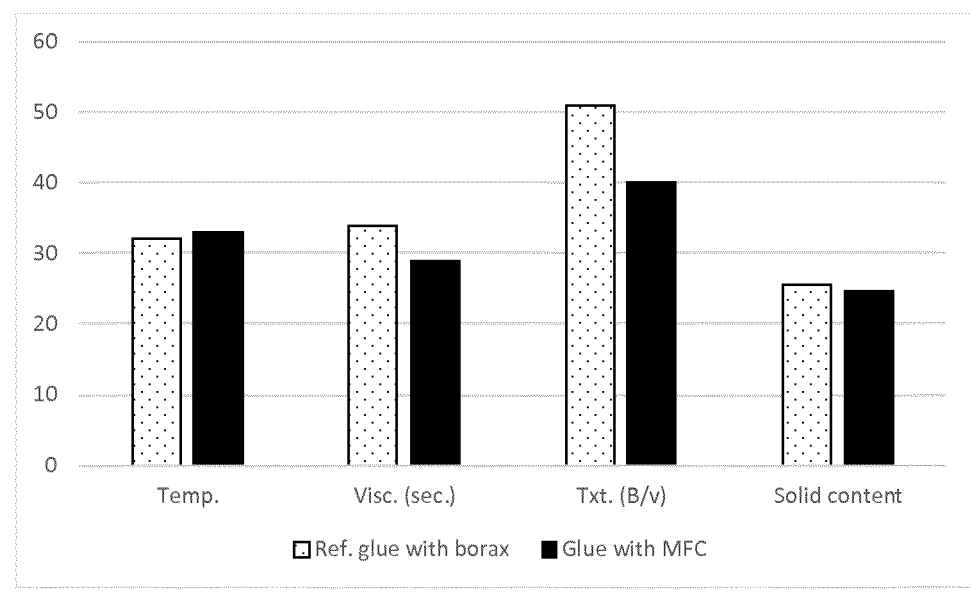

After 24 hours of storage, the viscosity and solid content of the adhesives were measured, and the values are given in Table 1 and FIG. 2.

TABLE 1

Properties of starch adhesives crosslinked by either borax (reference adhesive) or MFC, after 24 hrs storage. Initial viscosities were 28 and 29 sec., respectively.

| Sample | Temp. [° C.] | Viscosity [sec] | Brookfield [mPa s] | Txt. [B/v] | Solid content [%] |
|---|---|---|---|---|---|
| Ref. adhesive with borax | 32 | 34 | 1740 | 51 | 25.5 |
| Adhesive with MFC | 33 | 29 | 1160 | 40 | 24.6 |

The starch adhesive with MFC had a stable viscosity after 24 hours storage at 37° C., and could be used as it was for cardboard production with no extra addition of water. During storage, the adhesive with MFC was stirred for 5 minutes every 4$^{th}$ hr. In contrast, the starch adhesive with borax was less stable, and showed an increase in viscosity from 28 seconds to 34 seconds after 24 hours storage and had to be stirred for 5 minutes every hour to reduce the viscosity of the adhesive and prevent sedimentation. The starch-MFC crosslinked adhesive had a shorter texture than the starch-borax crosslinked adhesive, see Table 1 and FIG. 2.

Both adhesives, the starch adhesive crosslinked by MFC and the starch adhesive crosslinked by borax, were used on corrugated boards BB25c quality. Both adhesives were run with the same process parameters on a corrugator machine from BHS (wet end) and Fosber (dry end). For the starch-MFC adhesive the production was run at normal speed as well as high speed (see Table 2).

TABLE 2

Overview of process parameters for running corrugated board BB25c quality.

| Sample | Layer | Speed m/min |
|---|---|---|
| Ref. adhesive with borax | RV/Single Facer (Inner Liner) | 207 |
| Adhesive with MFC | RV/Single Facer (Inner Liner) | 207 |
| Adhesive with MFC | RV/Single Facer (Inner Liner) | 250 |

Samples were analyzed in the laboratory according to the standard test methods given in Table 3. The resulting values for both the reference adhesive with borax and the adhesive with MFC are given in FIGS. 3 and 4.

TABLE 3

Standard references.

| Conditions | Grammage | Thickness | Water absorption | Humidity |
|---|---|---|---|---|
| 23° C.-50RH % ISO 187 | g/m$^2$ ISO 536 | m.m. ISO 3034 | Cobb$_{60}$-g/m$^2$ ISO 535 | % ISO 287 |
| Bursting strength | Edge wise crush resistance | PAT | Bending resistance | Box compression |
| kPa ISO 2759 | kN/m ISO 3037 | N/m Fefco nr.11 | Md/cd-Nm ISO 2493 | BCT-N ISO 12048 |

Figure 3:
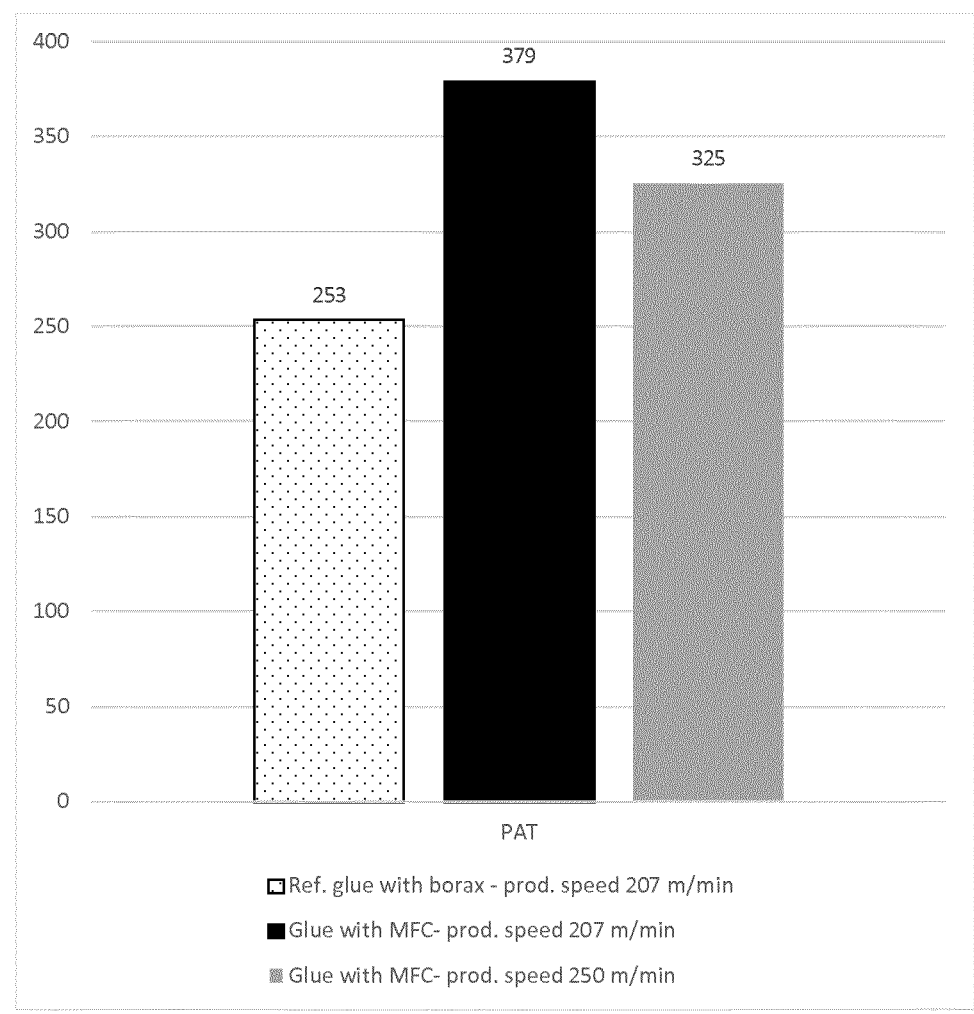

The adhesive with MFC crosslinked starch gave flatter corrugated boards. The pin adhesion method (PAT) was used to measure the adhesion strength between the flutes and liners of corrugated board. As can be seen in FIG. 3, the starch-MFC adhesive gave better bonding strength of the boards, both at similar and higher production speeds. (Adhesion strength of the MFC adhesive compared to the reference borax adhesive measured by pin adhesion test (PAT) on BB25c boards run at 207 and 250 m/min.)

Figure 4:
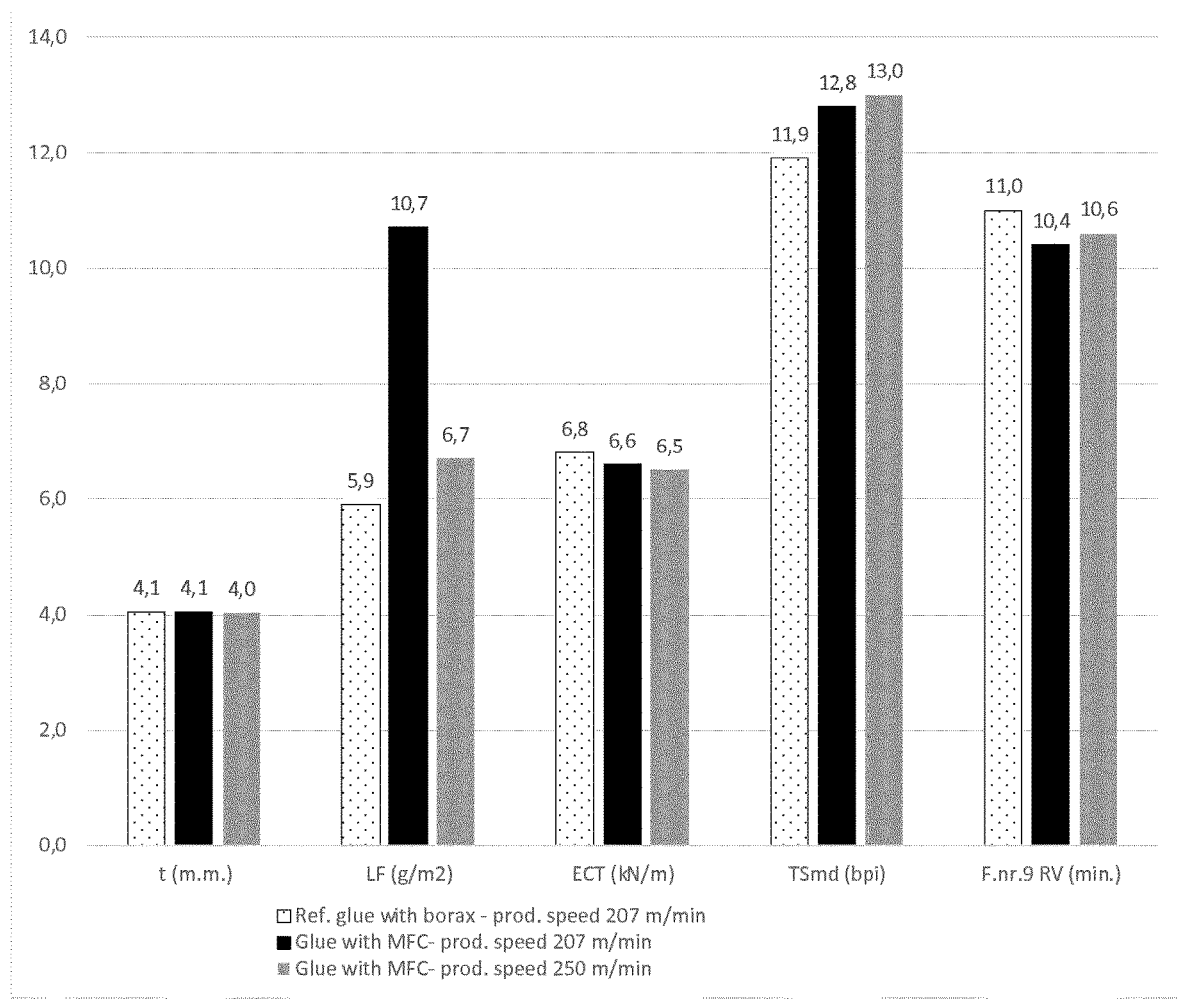

No negative results were observed for the board samples as analyzed and as made with starch-MFC crosslinked adhesive, see FIG. 4, which shows the results of standardized test measurements of conditioned samples run with adhesive with MFC at normal and high speed, compared to reference adhesive with borax.

Overall, it can be concluded that by using MFC as a cross linker in a starch-based adhesive, instead of borax, the following advantages may be observed, either all of these advantages or at least a sub-set thereof:
- stable viscosity against high shear and during storage
- stable quality of the adhesive during storage (no or less sedimentation)
- improved texture and a shear thinning effect which are improving the application properties of the adhesive
- improved bonding strength of corrugated sheets and cardboards
- higher production speed
- flatter boards The stable viscosity of the adhesive with MFC crosslinked starch also means that there is no need for additional additions of water over time, since the adhesive quality remains intact. This also means that the solid content remains unchanged and the adhesive can be kept over weekends and still be used as it is on Mondays. This opens up the possibility of a continuous adhesive production line.

Example 5

Preparation of a Polyvinyl Alcohol Adhesive Comprising Microfibrillated Cellulose As an example of another polymer that can be crosslinked with microfibrillated cellulose, a polyvinyl alcohol (PVA) adhesive comprising Microfibrillated Cellulose was prepared based on the following ingredients and manufactured according to the following steps:

The polyvinyl alcohol adhesive was obtained by mixing a powder comprising polyvinyl alcohol (and vinyl acetate) with water. The powder did not contain boric acid. Microfibrillated Cellulose (Exilva P01-L as provided by Borregaard, which has 2% dry matter) was mixed with water prior to adding the powdered mixture.

Three different samples were prepared by varying the concentration of Microfibrillated Cellulose as follows: 0.55%; 0.25% and 0.1%.

The exact masses of the different components are given in Table 4.

Firstly the required amount of water was added to a glass flask. The microfibrillated cellulose was then introduced to the water and stirred with a three blades propeller at 400 1/min until the microfibrillated cellulose was totally dissolved in the water. The required amount of the PVA powder-mix was then added to the mixture water/microfibrillated cellulose under stirring at 400 1/min until the powder was completely dissolved in the mixture water/microfibrillated cellulose. Afterwards, the overall mixture was introduced in an oil bath at 93° C. and stirred at 1000 1/min for 40 minutes.

TABLE 4

Composition of the polyvinyl alcohol adhesives crosslinked with MFC

| | concentration of microfibrillated cellulose (w-%) | mass of microfibrillated cellulose (g) | mass of pva powder-mix (g) | mass of water (g) | total mass (g) |
|---|---|---|---|---|---|
| 1 | 0.55 | 81.90 | 88.45 | 129.65 | 300 |
| 2 | 0.25 | 37.5 | 90.09 | 172.41 | 300 |
| 3 | 0.1 | 15 | 90.09 | 194.91 | 300 |

The pH of the adhesives was between 4 and 5.

Example 6

Preparation of a Polyvinyl Alcohol Adhesive Comprising Boric Acid (Reference)

A polyvinyl alcohol adhesive comprising boric acid was prepared based on the following ingredients and manufactured according to the following steps:

The polyvinyl alcohol adhesive was prepared by mixing a powder comprising polyvinyl alcohol (and vinyl acetate) and boric acid with water. The powdered mix is commercially available as "Supermix" by Borregaard.

The required amount of water was first added to a glass flask. The required amount of the PVA powder-mix comprising boric acid was then added to the water under stirring at 400 1/min until the powder was totally dissolved in the water. Afterwards, the overall mixture was introduced in an oil bath at 93° C. and stirred at 1000 1/min for 40 minutes. The concentration of boric acid in the final formulation was 0.54%.

The pH of the adhesive was between 4 and 5.

TABLE 5

Composition of the polyvinyl alcohol adhesives crosslinked with boric acid (Reference)

| | mass of pva powder-mix containing boric acid (g) | mass of water (g) | total mass (g) |
|---|---|---|---|
| 1 | 90.09 | 209.91 | 300 |

Example 7

Laboratory Tests of the Polyvinyl Alcohol Adhesives Crosslinked by MFC or Boric Acid The adhesives were characterized in terms of DIN viscosity, solid content and tackiness. The DIN viscosity was measured with a DIN Cup TQC DIN 8 mm VF2219-009 according to DIN 53211. The DIN cup consists of a conventional cup containing a conical opening. The cup is filled with the adhesive while closing the orifice by placing a finger over the hole. Once the cup is fully filled i.e. the meniscus of the liquid is above the rim of the cup, the orifice is opened and simultaneously a timer is started. The flow time is measured as soon as the first break in the efflux stream is observed.

TABLE 6

DIN viscosity and solid content of the polyvinyl alcohol adhesives crosslinked with MFC or boric acid

| | DIN viscosity (sec) | Solid content (%) |
|---|---|---|
| Reference-PVA with boric acid | 58 | 28.2 |

TABLE 6-continued

DIN viscosity and solid content of the polyvinyl alcohol adhesives crosslinked with MFC or boric acid

| | DIN viscosity (sec) | Solid content (%) |
|---|---|---|
| PVA with 0.1% MFC (without boric acid) | 56 | 30 |
| PVA with 0.25% MFC (without boric acid) | 122 | — |

The PVA adhesive comprising 0.55% Microfibrillated Cellulose was too thick to be measured by the DIN viscosity measurement method.

Figure 5:
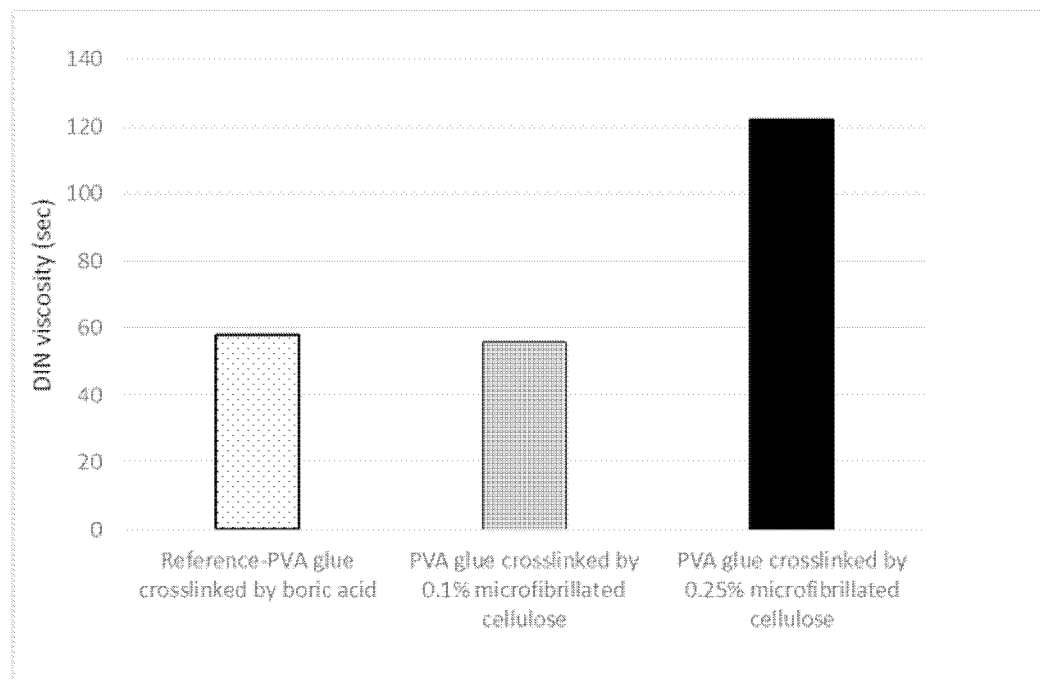

The DIN viscosity of the PVA adhesive containing 0.1% Microfibrillated Cellulose was comparable to that of the reference (FIG. 5). The solid content of the PVA adhesive containing 0.1% Microfibrillated Cellulose was slightly higher than that of the reference.

Tack tests were performed on the different adhesives. Two strips of paper were sticked together by applying a certain amount of adhesive on one of the sheet of paper with an applicator. Pressure was applied for 20 seconds by hand on the second sheet of paper which is after the 20 seconds peeled off.

It was observed that similarly to the reference, the PVA glue comprising Microfibrillated Cellulose exhibits a good tack property since fiber residues remain on the paper sheet.

The increase in viscosity and good tack property demonstrate that microfibrillated cellulose is able to function as a crosslinker for polyvinyl alcohol, just as well, if not better, than boric acid. The OH groups of the MFC seem to bond to the hydroxyl groups of the PVA, and, without wishing to be bound to theory, to the functional groups of the amount of polyvinyl acetate present.

The polyvinyl alcohol gels were made from the polyvinyl alcohol polymer, with MFC added as a crosslinking agent in water. From the experimental results, the viscosity of the polyvinyl alcohol solution was found to increase with increasing MFC content, and in fact, microfibrillated cellulose was found to be a far more efficient crosslinker than boric acid in increasing the viscosity of the polyvinyl alcohol gel. A concentration of 0.10% MFC gave the same DIN viscosity as 0.54% boric acid, on total formulation of the PVA adhesive (Table 6 and FIG. 5).

Example 8

Preparation of a High Shear Viscosity Stable Starch Adhesive Comprising Microfibrillated Cellulose A starch based corrugated paperboard adhesive, crosslinked by MFC, was prepared according to the Stein Hall starch adhesive process, which is further outlined below. The viscosities at different process steps were measured online by a viscometer.

An adhesive in accordance with the present invention was prepared based on the following ingredients and manufactured according to the following steps:

400 kg of primary water

The temperature is set to 38° C.

36 kg of primary wheat starch

Stirring for 15 seconds at 38° C.

70 kg of water 21.5 kg of primary caustic soda

Stirring for 900 seconds
  650 kg of secondary water
  0.4 kg of disinfectant
The temperature is set to 30° C.
  400 kg of secondary wheat starch
  20 kg MFC (Exilva PBX 01-V)
Stirring for 200 seconds
Viscosity control, final: 28.4 seconds.

The bulk of the Stein Hall adhesive consists of raw unswollen wheat starch, suspended in a starch thickened solution. Microfibrillated cellulose was added under high speed stirring (1500 rpm), after the addition and inmix of the secondary portion of starch. Microfibrillated cellulose was easily dispersed in the mixture. The concentration of MFC in the final formulation was 0.13%. The dry mass fraction of the MFC crosslinker was 0.43% (the ratio polymer to crosslinker was 218:1).

Example 9

Preparation of a Starch Based Adhesive Comprising Borax (Reference)

A reference adhesive was prepared according to the Stein Hall starch adhesive process, and is based on the following ingredients and manufactured according to the following steps:
  400 kg of primary water
The temperature is set to 38° C.
  36 kg of primary wheat starch
Stirring for 15 seconds at 38° C.
  70 kg of water
  21.5 kg of primary caustic soda
Stirring for 900 seconds
  650 kg of secondary water
  0.4 kg of disinfectant
The temperature is set to 30° C.
  400 kg of secondary wheat starch
  4.3 kg borax
Stirring for 200 seconds
Viscosity control, final: 37.2 seconds.

The bulk of the Stein Hall adhesive consists of raw unswollen wheat starch, suspended in a starch thickened solution containing borax and caustic soda to increase the viscosity and tack and lower the gel temperature of the unswollen starch.

Borax is added after the addition and inmix of the secondary starch. The concentration of borax in the final formulation was 0.27%.

Example 10

Testing the Viscosity Stability Under High Shear of the Adhesive Comprising Microfibrillated Cellulose Compared to the Reference Adhesive Comprising Borax After the addition of the microfibrillated cellulose in the last process step of the adhesive manufacturing in Example 8, the viscosity of the adhesive was 28.4 sec. After 15 minutes of stirring at 1500 rpm the viscosity of the adhesive was 27.6 sec. The temperature of the adhesive increased from 31 to 33° C. during the 15 minutes of stirring.

The viscosity of the adhesive was measured before and after the addition of microfibrillated cellulose under high shear (1500 rpm) at time 10:52 (AM). After an instant initial viscosity increase upon addition of microfibrillated cellulose, the viscosity remained stable for 15 minutes of high shear stirring.

After the addition of borax in the last process step, the viscosity of the adhesive in Example 9 was 37.2 sec. After 15 minutes of stirring at 1500 rpm, the viscosity of the adhesive was decreased to 27.0 sec. The temperature of the reference adhesive increased from 31 to 34° C. during the 15 minutes of stirring.

The microfibrillated cellulose crosslinking is providing an extremely viscosity stable starch gel against high shear. With microfibrillated cellulose as a crosslinker instead of borax, the high shear viscosity stability of the starch adhesive made by the Stein Hall process is substantially improved. In addition, the microfibrillated cellulose is a far more efficient crosslinker in the Stein Hall starch adhesive, and the amount of crosslinker can be reduced with 57% compared to borax.

Example 11

Testing the Adhesives Prepared According to the "Stein Hall" Process on Corrugated Boards In the following example, the starch adhesive crosslinked by MFC and the starch adhesive crosslinked by borax (reference) as prepared according to the Stein Hall process (Examples 8 and 9), were used on corrugated boards of BB24b quality manufactured by a BHS/Fosber combined corrugator machine.

The adhesives were applied on the most challenging side, which is the outer side (outside of the box) called LV layer (double backer). The production of the corrugated boards with the reference adhesive was run at 232 m/min, while the production of the boards with the adhesive crosslinked by MFC was run at 250 m/min (see Table 7). The glue gap was set to 0.08 mm for the both adhesives.

TABLE 7

Overview of process parameters for running corrugated boards BB24b quality

| Sample | Layer | Speed m/min |
|---|---|---|
| Ref. adhesive with borax | LV (Outer Liner) | 232 |
| Adhesive with MFC | LV (Outer Liner) | 250 |

Figure 7:
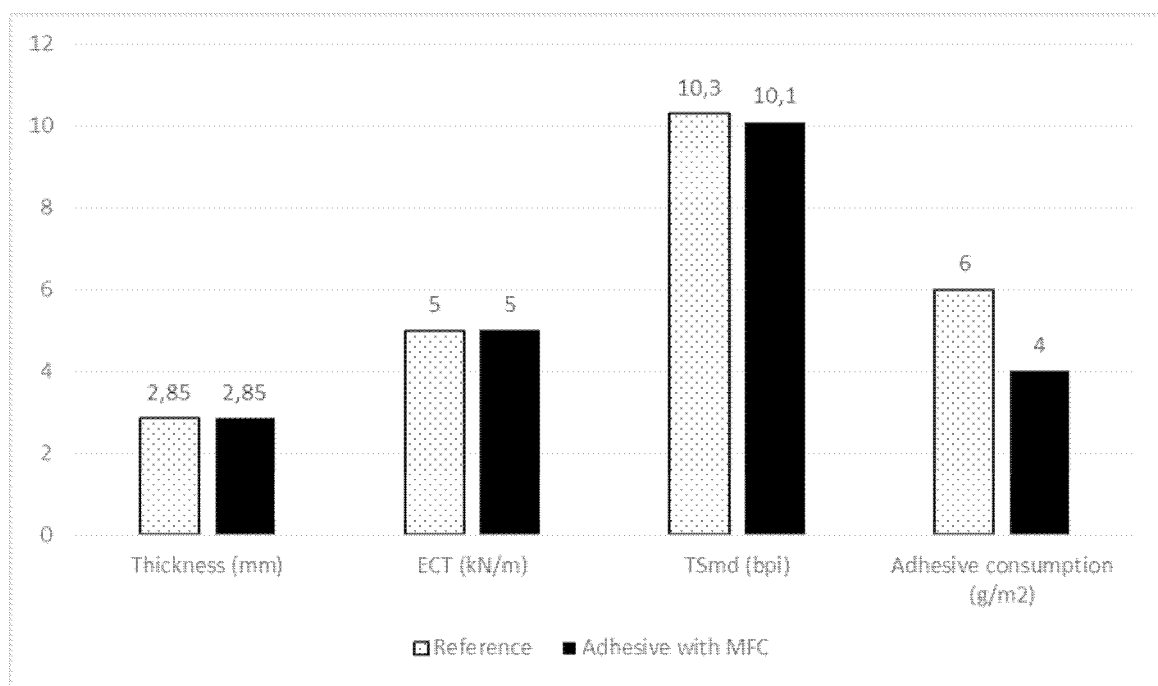
Figure 8:
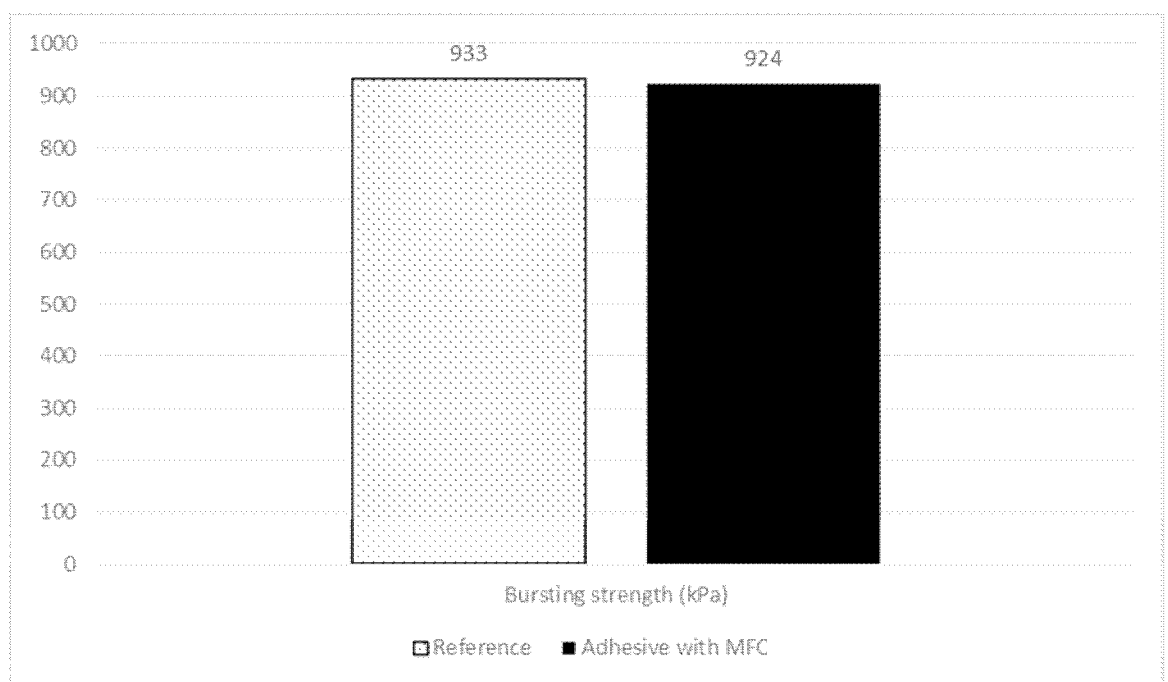

Samples were analyzed in the laboratory according to the standard test methods given in Table 8. The resulting values for both the reference adhesive with borax and the adhesive with MFC are given in FIGS. 6, 7 and 8.

TABLE 8

Standard test references

| Conditions | Grammage | Thickness | Water absorption | Humidity |
|---|---|---|---|---|
| 23° C.-50RH % ISO 187 | g/m$^2$ ISO 536 | m.m. ISO 3034 | Cobb$_{60}$-g/m$^2$ ISO 535 | % ISO 287 |
| Bursting strength | Edge wise crush resistance | PAT | Bending resistance | Box compression |
| kPa ISO 2759 | kN/m ISO 3037 | N/m Fefco nr.11 | Md/cd-Nm ISO 2493 | BCT-N ISO 12048 |

Figure 6:
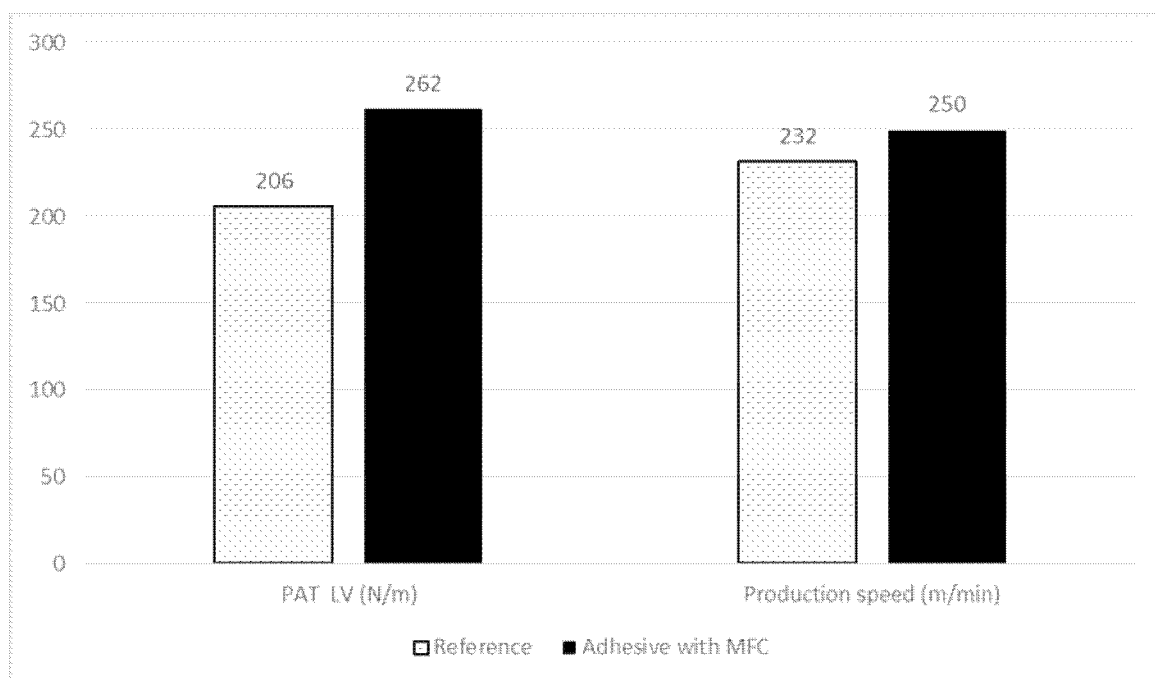

The adhesive with MFC crosslinked starch gave remarkably flatter corrugated boards. The pin adhesion method (PAT) was used to measure the adhesion strength between the flutes and liners of corrugated boards. As can be seen in FIG. 6, the starch-MFC adhesive gave a better bonding strength of the boards compared to the reference adhesive. With MFC as a crosslinking agent in the starch adhesive, the adhesive consumption was reduced with 33% (FIG. 7), the production speed was increased with 8% and the bond strength was increased with 27% (FIG. 6) compared to the reference adhesive crosslinked with borax. From FIGS. 7 and 8, it can be seen that the thickness, edgewise crush resistance (ECT), torsional strength (stiffness) and bursting strength were comparable for both adhesives. The torsional strength/stiffness (TSmd, bpi) was measured according to GTm34024.

From this test it can be concluded that by using microfibrillated cellulose as a crosslinker in the Stein Hall starch adhesive, less adhesive can be applied and stronger bonds are formed, as well as improved production speeds and flatter boards compared to the reference adhesive with borax.

The invention claimed is:

1. An adhesive composition, said composition comprising:
   microfibrillated cellulose;
   at least one solvent, wherein the at least one solvent is present in an amount of from 30% to 80% by weight, relative to overall weight of the composition; and
   at least one compound that is (a) capable of polymerizing, or has already partly or fully polymerized, and that (b) has at least two groups available for hydrogen bonding that are capable of crosslinking with at least one functional group of the microfibrillated cellulose, wherein the at least one compound comprises at least one starch or starch derivative.

2. The adhesive composition according to claim 1, wherein a diameter of microfibrillated cellulose fibrils comprised in the microfibrillated cellulose is from 1 nm to 1000 nm.

3. The adhesive composition according to claim 1, wherein the microfibrillated cellulose is present in concentrations of from 0.001% dry matter, relative to the overall weight of the composition to 10% dry matter or wherein the amount of microfibrillated cellulose in said composition is from 0.02% w/w relative to the overall weight of the composition to 8% w/w.

4. The adhesive composition according to claim 1, wherein each of the at least one functional group of the microfibrillated cellulose is selected from the group consisting of hydroxyl groups, carboxyl groups, ester groups, ether groups, and aldehyde functionality.

5. The adhesive composition according to claim 1, wherein the solvent is a polar solvent.

6. The adhesive composition according to claim 1, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition comprises a member selected from the group consisting of: at least one polyvinyl alcohol, at least one polyvinyl acetate, at least one polypeptide, at least one acrylate, at least one acrylamide, at least one ethylene oxide, at least one propylene oxide, at least one glycol, at least one polyether, at least one polyester, at least one polyol, at least one epoxy resin, at least one polyurethane, at least one polyacrylate, at least one polyurea and at least one carbamide.

7. The adhesive composition according to claim 6, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition comprises at least one glycol and the at least one glycol comprises at least one polyethylene glycol or at least one polypropylene glycol.

8. The adhesive composition according to claim 1, wherein the composition comprises no crosslinking agent other than microfibrillated cellulose.

9. The adhesive composition according to claim 8, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition is at least one starch or starch derivative.

10. The adhesive composition according to claim 9, wherein said composition comprises no or only trace amounts of borax.

11. The adhesive composition according to claim 9, wherein the weight ratio of microfibrillated cellulose to starch or starch derivative is from 1:1500 to 1:50.

12. The adhesive composition according to claim 1, wherein the microfibrillated cellulose is characterized in that it results in gel-like dispersion that has a zero shear viscosity, no, of at least 2000 Pa·s, as measured in polyethylene glycol (PEG) and at a solids content of the microfibrillated cellulose of 0.65%.

13. The adhesive composition according to claim 1, wherein the microfibrillated cellulose is characterized by a water holding capacity, as measured by diluting MFC samples to a 0.3% solids content in water, and then centrifuging the samples at 1000 G for 15 minutes, after which a clear water phase is separated from sediment and the sediment is weighed, wherein the water holding capacity is given as (mV/mT)−1 wherein mV is the weight of the sediment when wet and mT is the weight of dry MFC analyzed.

14. The adhesive composition according to claim 1, wherein the microfibrillated cellulose is a cross-linking agent.

15. The adhesive composition according to claim 14, wherein the adhesive composition comprises no or only trace amounts of borax.

16. The adhesive composition according to claim 1, wherein the microfibrillated cellulose is prepared by a process, which comprises at least the following steps:
   (a) subjecting a cellulose pulp to at least one mechanical pretreatment step;
   (b) subjecting the mechanically pretreated cellulose pulp of step (a) to a homogenizing step, which results in fibrils and fibril bundles of reduced length and diameter vis-à-vis cellulose fibers present in the mechanically pretreated cellulose pulp of step (a), said step (b) resulting in microfibrillated cellulose;
   wherein the homogenizing step (b) involves compressing the cellulose pulp from step (a) and subjecting the cellulose pulp to a pressure drop.

17. The adhesive composition of claim 1, wherein at least one of: (i) the microfibrillated cellulose is present in a concentration of from 0.05% dry matter, relative to the overall weight of the composition, to 2% dry matter and (ii) the amount of microfibrillated cellulose in the composition is from 0.05% w/w relative to the overall weight of the composition to 0.2% w/w.

18. The adhesive composition according to claim 1, wherein the composition comprises no or only trace amounts of boric acid, borax, glyoxal, glutaraldehyde, formaldehyde, citric acid or (poly)carboxylic acids, N,N-methylbiacrylamide, dicaproxypropylene succinate, aldehyde based or oxidized polysaccharides, bis-benzidine-2,2'-disulfonic acid, 1,5-difluoro-2,4-dinitrobenzene, dimethyl adipate, epoxy, organic peroxides, trisodium citrate, phosphorous oxychloride, chlorohydrins, salts or derivatives of trimetaphosphate (TMF), e.g. sodium trimetaphosphate, sodium tripolyphosphates, polymetaphosphates, POC13, biphenyl compounds, N,N,-dimethylol-imidzolidon-2 (DMEU), cyanuric chloride, adipate, adipic acetic mixed anhydride, adipic acid/acetic acid, epichlorohydrin, sodium aluminate, divinylbenzene, divinylsulfone, or salts thereof.

19. The adhesive composition according to claim 1, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition comprises a member selected from the group consisting of: at least one polyvinyl alcohol, at least one polyvinyl acetate, at least one carbohydrate, at least one polypeptide, at least one acrylate, at least one acrylamide, at least one ethylene oxide, at least one propylene oxide, at least one glycol, at least one polyether, at least one polyester, at least one polyol, at least one epoxy resin, at least one polyurethane, at least one polyacrylate, at least one polyurea and at least one carbamide.

20. The adhesive composition according to claim 19, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition comprises the at least one carbohydrate and the at least one carbohydrate comprises at least one polysaccharide.

21. The adhesive composition according to claim 19, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition comprises the at least one glycol and the at least one glycol comprises at least one polyethylene glycol or at least one polypropylene glycol.

22. The adhesive composition according to claim 1, wherein the at least one compound that is (a) capable of polymerizing, or has already partly or fully polymerized, and that (b) has at least two groups available for hydrogen bonding that are capable of crosslinking with at least one functional group of the microfibrillated cellulose in the composition is at least one starch or starch derivative.

* * * * *